United States Patent [19]

Scharpenberg

[11] Patent Number: 4,655,993
[45] Date of Patent: Apr. 7, 1987

[54] METHOD AND APPARATUS FOR LOCATING DEFECTIVE FUEL ROD CLADDING TUBES OF WATER-COOLED NUCLEAR REACTORS

[75] Inventor: Rainer Scharpenberg, Waldmichelbach, Fed. Rep. of Germany

[73] Assignee: Brown Boveri Reaktor GmbH, Mannheim, Fed. Rep. of Germany

[21] Appl. No.: 633,408

[22] Filed: Jul. 23, 1984

[30] Foreign Application Priority Data

Oct. 12, 1983 [DE] Fed. Rep. of Germany ....... 3337084

[51] Int. Cl.$^4$ ............................................. G21C 17/00
[52] U.S. Cl. .................................... 376/252; 376/245
[58] Field of Search ............................... 376/251–253, 376/245

[56] References Cited

U.S. PATENT DOCUMENTS

| | | | |
|---|---|---|---|
| 4,016,749 | 4/1977 | Wachter | 376/252 |
| 4,048,009 | 9/1977 | Weilbacher | 376/245 |
| 4,175,000 | 11/1979 | Jabsen | 376/251 |
| 4,193,843 | 3/1980 | Womack et al. | 376/252 |
| 4,274,205 | 6/1981 | Starr et al. | 376/245 |
| 4,517,152 | 5/1985 | Pieper et al. | 376/252 |

FOREIGN PATENT DOCUMENTS

| | | |
|---|---|---|
| 0053066 | 6/1982 | European Pat. Off. . |
| 0080418 | 6/1983 | European Pat. Off. . |
| 2558631 | 7/1976 | Fed. Rep. of Germany . |
| 2605962 | 8/1977 | Fed. Rep. of Germany . |
| 2659555 | 7/1978 | Fed. Rep. of Germany . |
| 2298859 | 8/1976 | France . |
| 2525799 | 10/1983 | France . |
| 51-1893 | 1/1976 | Japan ................................... 376/252 |

Primary Examiner—Salvatore Cangialosi
Attorney, Agent, or Firm—Herbert L. Lerner; Laurence A. Greenberg

[57] ABSTRACT

A method for locating defective fuel rod cladding tubes of a water-cooled nuclear reactor within fuel rod bundles combined to form complete fuel assemblies disposed in a water-filled fuel assembly storage pit, including a mooring, a carriage disposed on the mooring, a manipulator disposed on the carriage and having a water proof space disposed therein, driving elements of the manipulator disposed in the water proof space, probes disposed directly in the water of the pit and connected to the driving elements, at least one ultrasonic test head disposed on each of the probes, and a lifting device for holding the fuel assemblies, includes: centering a fuel assembly to be tested on the mooring with the lifting device, moving the carriage into a test position, and transmitting motion cycles of the driving elements in the water proof space to the probes in the water of the pit for moving the probes and the test heads between the cladding tubes, and a device for carrying out the method.

16 Claims, 10 Drawing Figures

METHOD AND APPARATUS FOR LOCATING DEFECTIVE FUEL ROD CLADDING TUBES OF WATER-COOLED NUCLEAR REACTORS

The invention relates to a method for locating defective fuel rod cladding tubes within fuel rod bundles combined to form complete fuel assemblies of water-cooled nuclear reactors, which includes moving probes equipped with at least one ultrasonic test head between the fuel rod cladding tubes, and placing a manipulator for moving the probes on parts of a device disposed within a fuel assembly storage pit.

Such a method is known from the publication "Tagungsbericht der Jahrestagung Kerntechnik 1980" (Proceedings of the Annual Nuclear Engineering Meeting 1980), pages 827 to 831, of the Deutsche Atomforum e.v. (German Atomic Forum), Bonn, Germany.

However, nothing is stated therein with respect to the interaction of the fuel assembly and the apparatus for locating the cladding tubes. Apparently, only the successful performance of the method of insonification was of interest therein.

It is accordingly an object of the invention to provide a method and apparatus for locating defective fuel rod cladding tubes of water-cooled nuclear reactors which overcomes the disadvantages of the heretofore-known methods and devices of this general type, and with which the insonification method can be carried out simply and reliably.

With the foregoing and other objects in view there is provided, in accordance with the invention, a method for locating defective fuel rod cladding tubes of a water-cooled nuclear reactor within fuel rod bundles combined to form complete fuel assemblies disposed in a water-filled fuel assembly storage pit, including a mooring, a carriage disposed on the mooring, a manipulator disposed on the carriage and having a water proof space disposed therein, driving elements of the manipulator disposed in the water proof space, probes disposed directly in the water of the pit and connected to the driving elements, at least one ultrasonic test head disposed on each of said probes, and a lifting device for holding the fuel assemblies, which comprises: centering a fuel assembly to be tested on the mooring with the lifting device, moving the carriage into a test position, and transmitting motion cycles of the driving elements in the water proof space to the probes in the water of the pit for moving the probes and the test heads between the cladding tubes.

An advantage of this process is that the fuel assembly which is about four meters long is held reliably and always occupies a constant position relative to the carriage carrying the manipulator. Furthermore, an advantageous separation of the drive elements which must be accomodated in a water proof manner, and the desired probe motion, are obtained.

Further in accordance with the invention, there is provided a method for locating defective fuel rod cladding tubes of a water-cooled nuclear reactor within fuel rod bundles combined to form complete fuel assemblies disposed in a water-filled fuel assembly storage pit, including a receiving container for receiving a fuel assembly to be tested, a bracket, a manipulator disposed on the bracket and having a water proof space disposed therein, driving elements of the manipulator disposed in the water proof space, probes disposed directly in the water of the pit and connected to the driving elements, and at least one ultrasonic test head disposed on each of said probes, which comprises: securing a fuel assembly to be tested in the receiving container in a vertical position, locking the manipulator in a test position on the bracket, and transmitting motion cycles of the driving elements in the water proof space to the probes in the water of the pit for moving the probes and the test heads between the cladding tubes.

The combination of the manipulator with a conventional repair station permits acceleration of the fuel assembly exchange process and therefore leads to a gain in the availability of the nuclear power station.

In accordance with another mode of the invention, there is provided a first slider in the water proof space connected to the driving elements, a first lever linkage in the water proof space connected to the first slider, a second lever linkage in the water of the pit connected to the first lever linkage, and a second slider connected to the second lever linkage, the probes being supported by the second slider, and the method includes moving the first slider linearily in X and Y-directions with the driving elements, converting the linear motion of the first slider into rotary motion with the first lever linkage, transmitting the rotary motion of the first lever linkage in the water proof space into linear motion in the water of the pit with the second lever linkage, and transmitting the same linear motion of the second lever linkage to the second slider.

By taking these measures, the linear motion starting from the driving elements which are accomodated in a water proof manner, is transmitted to the probes to be moved in the water of the fuel assembly storage pit, with the interposition of a rotary motion and without causing sealing problems.

In order to carry out the method there is provided an apparatus for locating defective fuel rod cladding tubes of a water-cooled nuclear reactor within fuel rod bundles combined to form complete fuel assemblies, the fuel assemblies being disposed in fuel assembly storage racks in a water-filled assembly storage pit, and the fuel assemblies having bases, comprising a mooring, a plurality of pins connected to the mooring and matchable to the dimensions of the upper surface of a storage rack for securing the mooring, a centering receptacle with a variable centering dimension disposed on the mooring for contacting the base of the fuel assembly on two opposite sides thereof, a carriage movable on the mooring between two positions, a manipulator disposed on the carriage, the manipulator having a supporting base plate and a cover hood defining a water proof space therebetween, driving elements disposed in the water proof space, means connected to the driving elements and passing through the base plate for converting linear motion of the driving elements into rotary motion, probes disposed directly in the water of the storage pit and connected to the motion converting means, and at least one ultrasonic test head disposed on each of the probes, for insertion between the cladding tubes.

In accordance with another feature of the invention, the mooring includes a base plate having T-shaped slots formed therein, and the pins are in the form of sliding blocks movable and lockable in the slots. Therefore, the matching of the bolt spacings to different storage rack constructions is provided in a simple manner.

In accordance with a further feature of the invention, the mooring includes another base plate and the centering receptacle includes an abutment fastened to the other base plate, an eccentric shaft opposite the abutment, a rocker disposed on the shaft for moving the shaft by remote control, and a stop disposed on the shaft for limiting motion of the shaft.

Besides the variability of the centering receptacle, a particular advantage is seen in the fact that the highest point of the eccentricity cannot be exceeded because of a stop.

In accordance with an added feature of the invention, the centering receptacle includes a guide and jaws movable along the guide in opposing directions. In this way, the opening of the centering receptacle can be better adapted to different fuel assembly dimensions.

In accordance with an additional feature of the invention, the mooring includes another base plate and tracks fastened to the other base plate for guiding the carriage, the first-mentioned base plate of the manipulator having dowel pins protruding outwardly therefrom, the dowel pins being screwed into dowel holes formed in the other base plate, and including a remote control linkage and/or a hydraulic/pneumatic cylinder for moving the carriage.

In accordance with again another feature of the invention, there are provided means connected to the manipulator for admitting compressed air to the water proof space raising the pressure of the water proof space above the water pressure in the storage pit, and means connected to the manipulator for indicating a leak in the water proof space. This is done so that no water can penetrate into the water proof space of the manipulator through leaky supply lines.

In accordance with again a further feature of the invention, the motion converting means includes a flange passing through and bolted to the base plate of the manipulator, a hollow shaft with a free end and a solid shaft with a free end both being coaxial with the flange, a first lever connected to one of the free ends in the water proof space, a second lever connected to the other of the free ends outside the water proof space, a third lever articulatingly connected to the first lever, a fourth lever articulatingly connected to the second lever, the first and third levers forming a lever linkage in the water proof space in the form of a mirror-symmetrical parallelogram with a first fixed point or fulcrum in the water proof space, the second a fourth levers forming another lever linkage outside the water proof space in the form of another mirror-symmetrical parallelogram with a second fixed point or fulcrum outside the water proof space, a first slider connected to the first fixed point for executing linear driving motions, and a second slider connected to the second fixed point carrying the probe. Due to the coaxial disposition of the hollow and the solid shafts, the magnitude of the error in the transmission of the motions is kept small.

In accordance with again an added feature of the invention, there are provided two ball bushing spindles connected to the first slider for moving the first slider, and two stepping motors each being connected to a respective one of the spindles. The carriage which forms the fixed point or fulcrum of the lever linkage disposed in the water proof space is moved by two ball bushing spindles and the stepping motors. The travel distances given by the stepping motor are thereby transmitted without play.

In accordance with a concomitant feature of the invention, there is provided a force pickup associated with the second slider for protecting the probes against run-on motions thereof.

There is also provided another apparatus for locating defective fuel rod cladding tubes of a water-cooled nuclear reactor within fuel rod bundles combined to form complete fuel assemblies disposed in a water-filled fuel assembly storage pit, the fuel assemblies having bases, comprising a receiving container holding a fuel assembly to be tested in a vertical position, the container having a lower edge, the cladding tubes associated with the base of the fuel assembly having a portion thereof protruding beyond the lower edge of the container, a bracket attached to the storage pit, a manipulator locked on the bracket in a test position, the manipulator having a water proof space disposed therein, driving elements disposed in the water proof space, probes disposed directly in the water of the storage pit and connected to the driving elements, and at least one ultrasonic test head disposed on each of the probes for insertion between the cladding tubes at the portion of the cladding tubes protruding beyond the lower edge of the container.

Other features which are considered as characteristic for the invention are set forth in the appended claims.

Although the invention is illustrated and described herein as embodied in a method and apparatus for locating defective fuel rod cladding tubes of water-cooled nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
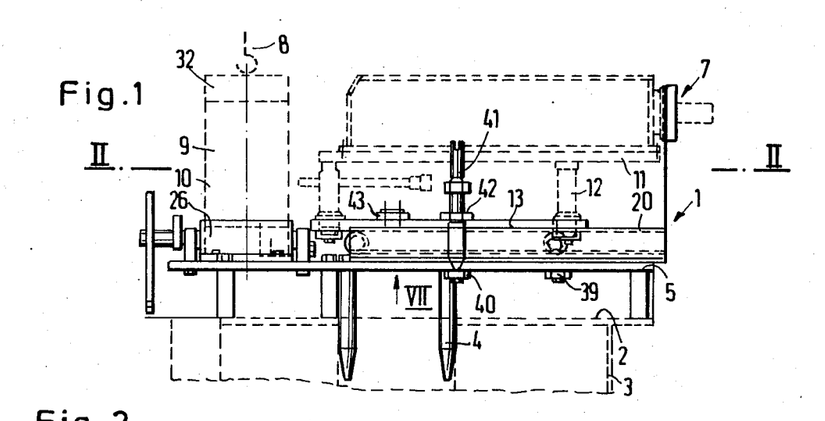
FIG. 1 is a diagrammatic side-elevational view, partly in phantom, of an apparatus for carrying out the method of the invention.
Figure 2:
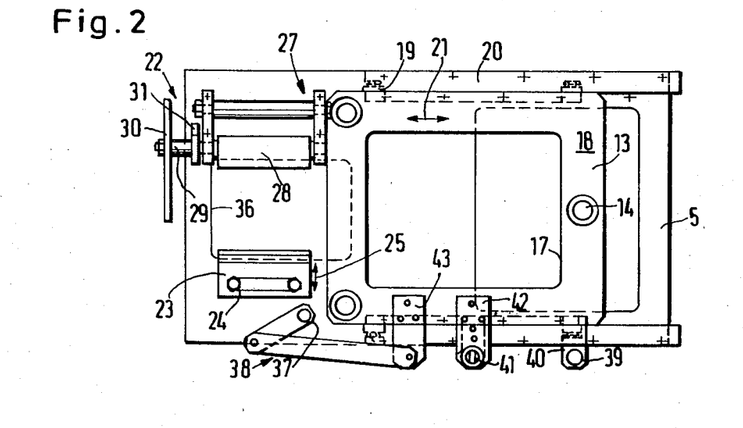
FIG. 2 is a top-plan view and FIG. 2a is a fragmentary top-plan view taken along the line II—II of FIG. 1.
Figure 2A:
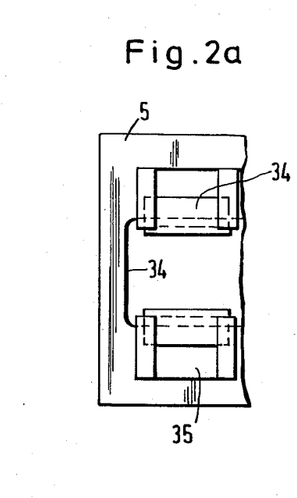
Figure 3:
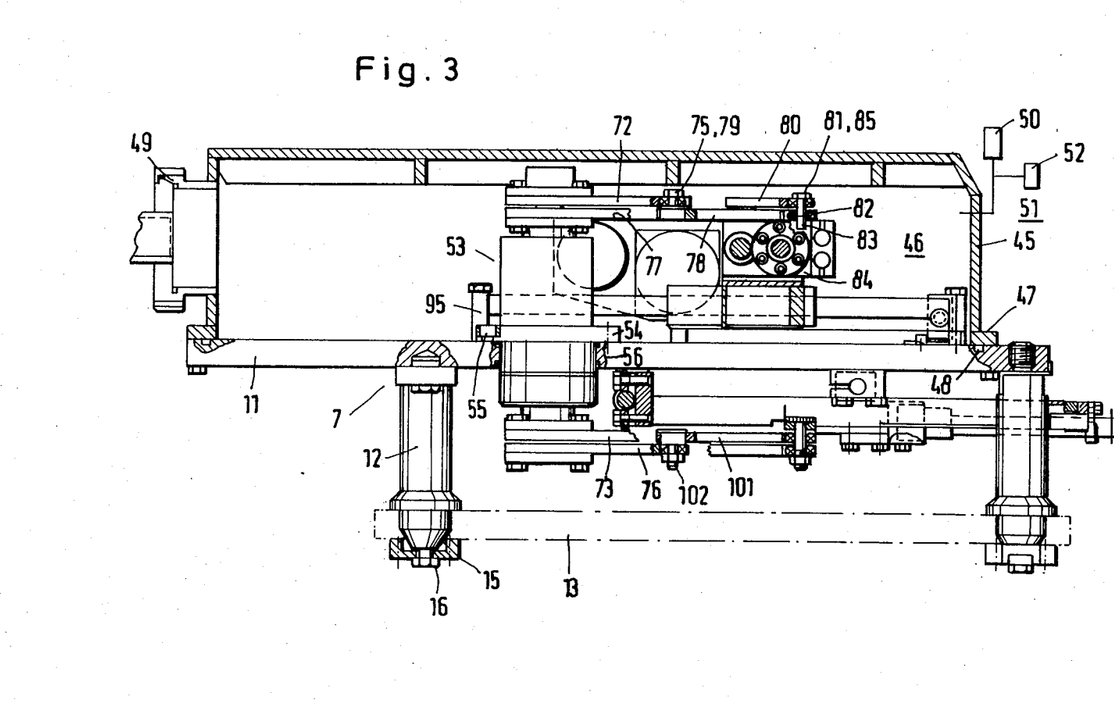
FIG. 3 is a partly cross-sectional and partly broken-away fragmentary side-elevational view of the manipulator.
Figure 7:
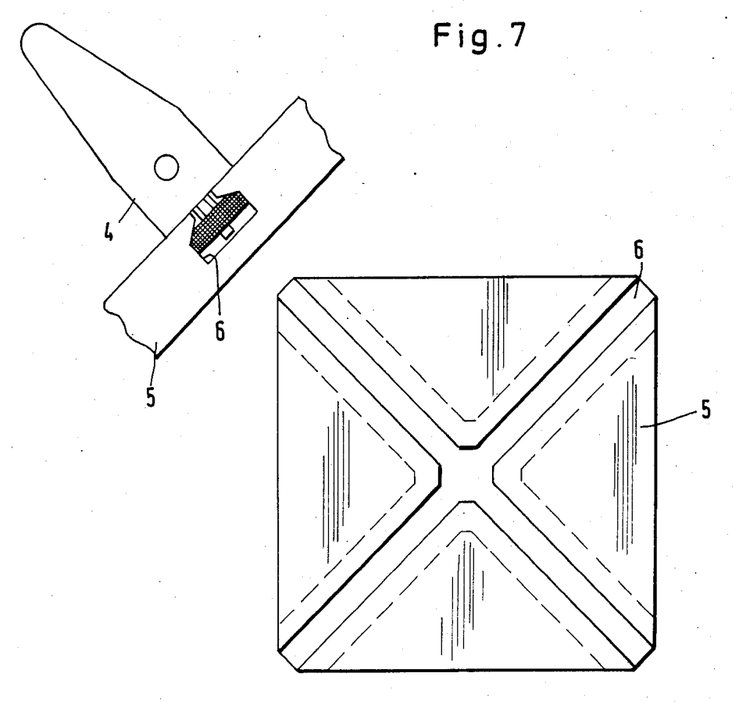
FIG. 7 is a fragmentary bottom-plan view taken in the direction of the arrow VII of FIG. 1.

Referring now to the figures of the drawings in detail and first particularly to FIG. 1 thereof, there is seen a mooring 1 in solid lines shown during its deposition motion onto an upper surface 2 of fuel assembly storage racks 3 which are shown in broken lines and which are disposed in a non-illustrated water pit. Pins 4 jut out downward from a base plate 5 of the mooring 1 and serve for locking the mooring at reference points of the storage racks. As shown in FIG. 7, the pins are guided and fastened in T-slots 6 which are worked into the lower surface of the base plate in diagonally crossing directions. The bolts are constructed in the form of sliding blocks and allow easy adjustment of the bolts to different dimensions of the storage rack. A manipulator 7, a fuel assembly 9 to be tested and a hook 8 of a non-illustrated lifting device at the fuel assembly, are also shown in broken lines above the mooring. The fuel assembly 9 and the manipulator 7 are located in this case under a water layer several meters deep. As will be explained below, probes 10 move within the water. The manipulator 7 is supported on a carriage 13 through dowel pins 12 linked to a base plate 11 of the manipulator. The dowel pins 12 extend into corresponding fitting holes 14 of the carriage 13 and are secured by means of washers 15 and screws 16, as seen in FIG. 3. As can also be seen from FIG. 2, the carriage 13 is formed of a plate 18 which has a cutout 17 formed therein and which is provided with rolling bodies 19 on opposite sides thereof. The carriage 13 can be moved in the direction of the arrow 21 by means of the rolling bodies disposed in tracks 20 fastened to the base plate 5. A centering receptacle 22 is also disposed on the base plate 5. The receptacle 22 is formed of an abutment 23 which can be adjusted in the direction of the arrow 25 due to a fastening 24 thereof through an elongated hole, for the purpose of adapting it to different sizes of a fuel assembly base 26. Opposite the abutment 23, a holding device 27 for an eccentric shaft 28 is fastened on the base plate 5. A rocker 30 is disposed on a shoulder 29 of the eccentric shaft. The free ends of the rocker 30 are fastened to non-illustrated cables. The eccentric shaft 28 can be rotated by these cables. The shoulder 29 also has a stop 31 disposed thereon, which comes to rest on the base plate with an appropriate adjustment, in such a manner that the eccentric shaft 28 is applied to the base of the fuel assembly to be centered before it reaches its highest point. A lifting device engages the head 32 of the fuel assembly, so that the fuel assembly 9 is suspended freely and is centered by the fuel assembly base 26. In vicinity of the fuel assembly to be centered, the base plate has a cutout 36 formed therein, so that the fuel assembly cannot make contact at that location. As an alternative to the centering receptacle described, it may be formed of two jaws 34 which can move in opposite directions along a guide 35, as seen in FIG. 2a. The carriage 13, which is provided with the cutout 17 for the purpose of saving weight, can be moved into a test position close to the fuel assembly (as shown in FIG. 2) and into a position distant from the fuel assembly. The motion cycle takes place under remote control by bringing a non-illustrated rod-shaped rod tool into engagement, from a location outside the water pit, with a fulcrum 37 of a linkage 38 and rotating the tool about the fulcrum. Two straps 40 jut out from the base plate 5. The straps have a through-hole 39 formed therein and are fastened to the underside of the base plate. A threaded bolt 41 can be turned into these through-holes by means of the same rod-shaped tool, for the purpose of securing the carriage 13. The distance between the through-holes is therefore equal to the travel distance of the carriage. The threaded bolt is guided in a strap 42 which is fastened to the upper surface. Not far from this strap, a holding element 43 also juts out from the upper surface of the carriage 13. The holding element 43 is engaged by the linkage 38 and triggers the lengthwise motion of the carriage 13. The carriage can also be moved by hydraulic or pneumatic driving elements. The manually-controllable linkage control, however, is preserved so that in the event of disturbances in the manipulator control, the return of the probes 10 from the fuel assembly is always assured. If the carriage could not be returned, disassembly would be necessary and would lead to damage to the probes, the manipulator and the fuel assembly.

Figure 5:
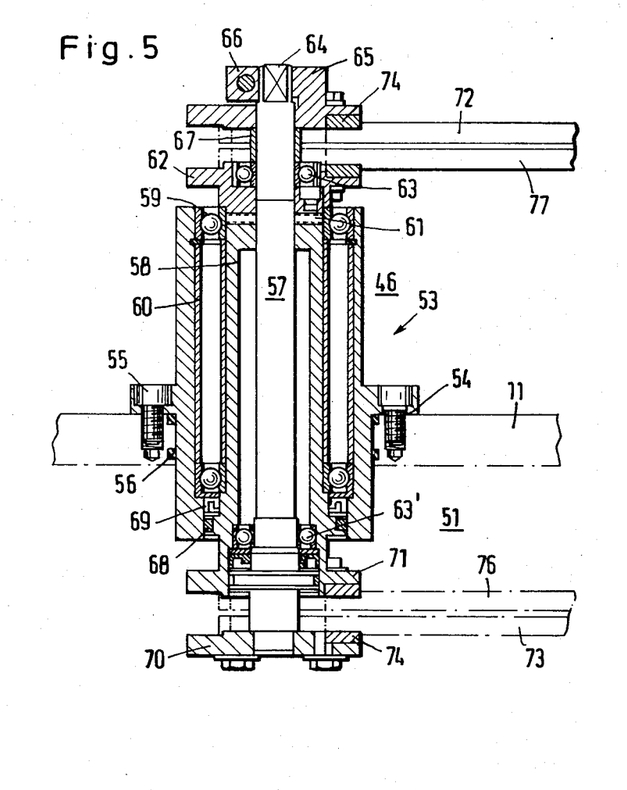
FIG. 5 is a fragmentary, longitudinal-sectional view of a part of the apparatus for converting linear motion into rotary motion.
Figure 5A:
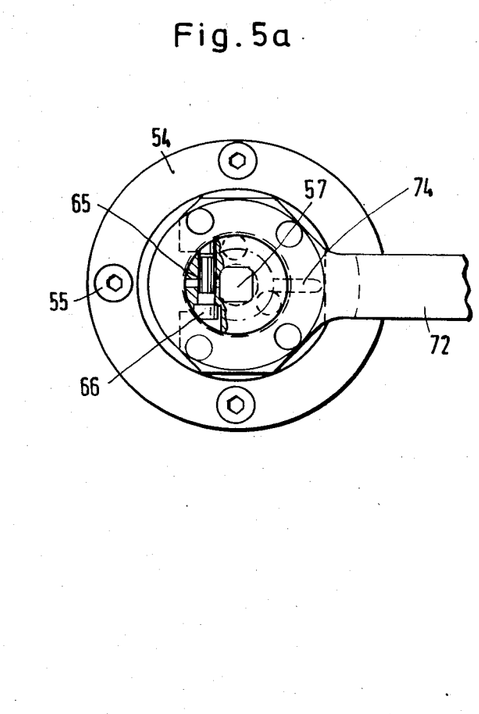
FIG. 5a is a fragmentary top-plan view of another embodiment of a centering receptacle.
Figure 6:
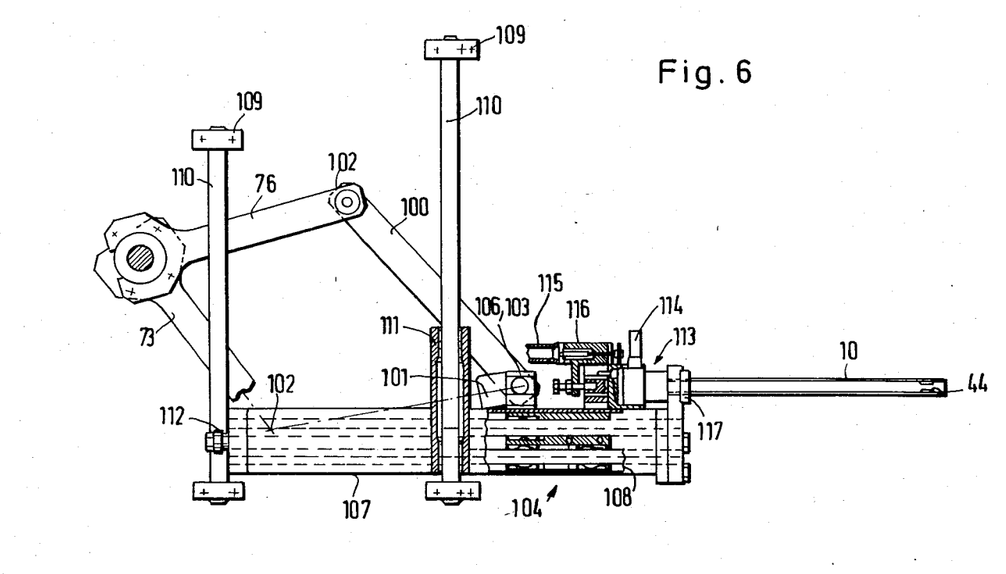
FIG. 6 is a fragmentary elevational view of a part of the manipulator disposed in the water of the fuel assembly storage pit.

FIGS. 3 to 6 show the manipulator and subassemblies thereof for moving the probes carrying ultrasonic testing heads 44. The base plate 11, from which the dowel pins 12 lead toward the carriage 13 of the mooring 1, and a cover hood 45, define a waterproof space 46 which encloses the driving elements. The cover hood 45 is fastened by means of screws 47 to the base plate 11 with the interposition of an O-ring 48. Electrical supply cables are led into the waterproof space 46 through a screw connection 49. Pressure is admitted to the waterproof space by a compressed-air source 50 at a pressure which is higher than the pressure prevailing in the surrounding water 51. Possible leaks in vicinity of the seals do not lead to damage to the driving elements, since monitoring devices 52 signal a pressure loss, so that countermeasures for sealing can be initiated in time. A part 53 of the apparatus required for the conversion of linear into rotary motion and from rotary motion back into similar linear motion, is shown in FIG. 3 in interaction with the driving elements, and is shown in FIG. 6 with its individual parts. The part 53 has a flange 54 which passes through the base plate 11 and is rigidly connected to the base plate by screws 55. In vicinity of the passage of the flange 54 through the base plate 11, O-rings 56 accomplish the required sealing. A solid shaft 57 and a hollow shaft 58 are disposed coaxially with respect to each other and with respect to the flange 54. The hollow shaft 58 is guided by ball bearings 59 in the flange 54 with the interposition of a spacer sleeve 60 and is supported in the axial direction. A flange 62 is provided for axially fixing the hollow shaft 58. The flange 62 is bolted to the shaft 58 through a claw coupling 61 and simultaneously contributes to the radial guidance of the solid shaft 57 with a ball bearing 63. The solid shaft receives its further radial support through a ball bearing 63' which is directly guided in the hollow shaft. The end of the solid shaft 57 extending into the waterproof space 46 of the manipulator 7, is provided with a square 64. The square 64 is plugged and centered into a carrier 65 and is secured by means of a clamping screw 66. With the interposition of a spacer sleeve 67, the carrier 65 serves for supporting the solid shaft in the axial direction relative to the hollow shaft and the flange 54. The ball bearings facing the water 51 are protected against the penetration of water by means of O-rings 68 and shaft sealing rings 69. The respective ends of the solid shaft disposed in the water have a carrier 70 rigidly connected thereto and the hollow shaft has a hub 71. Levers 72, 73 are bolted to the carriers 65, 70 of the solid shaft 57. The levers 72, 73 are constructed with mirror symmetry and are disposed relative to each other in mirror symmetry, so that the lever 73 disposed in the water of the pit executes the same motion as the lever 72 disposed in the waterproof space 46. The levers are accurately positioned by a slot-and-key connection 74. Levers 76, 77 which are similarly connected to the hub 71 and the flange 62 of the hollow shaft, are constructed with mirror symmetry and are disposed relative to each other with mirror symmetry. The manner of fastening the levers can be seen in FIG. 5a, which uses the connection to the carrier 65 as an example. As FIG. 3 shows, the free end of the lever 72 fastened to the carrier 65 of the solid shaft is articularingly connected in the waterproof space to a further lever 78 through a pin 75 supported by ball bearings. In the same manner, the lever 77 which is fastened to the flange 62 of the hollow shaft 58, is likewise connected to a further lever 80 through a pin 79 supported in ball bearings. The free ends of the further levers 78, 80 are brought together at a fulcrum 81, about which they can move via ball bearings 82. A threaded bolt 83, about which both levers 78, 80 can move, is screwed into a slider 84 and forms a funcrum 85 which can be moved in the X or Y-direction together with the slider 84.

Figure 4:
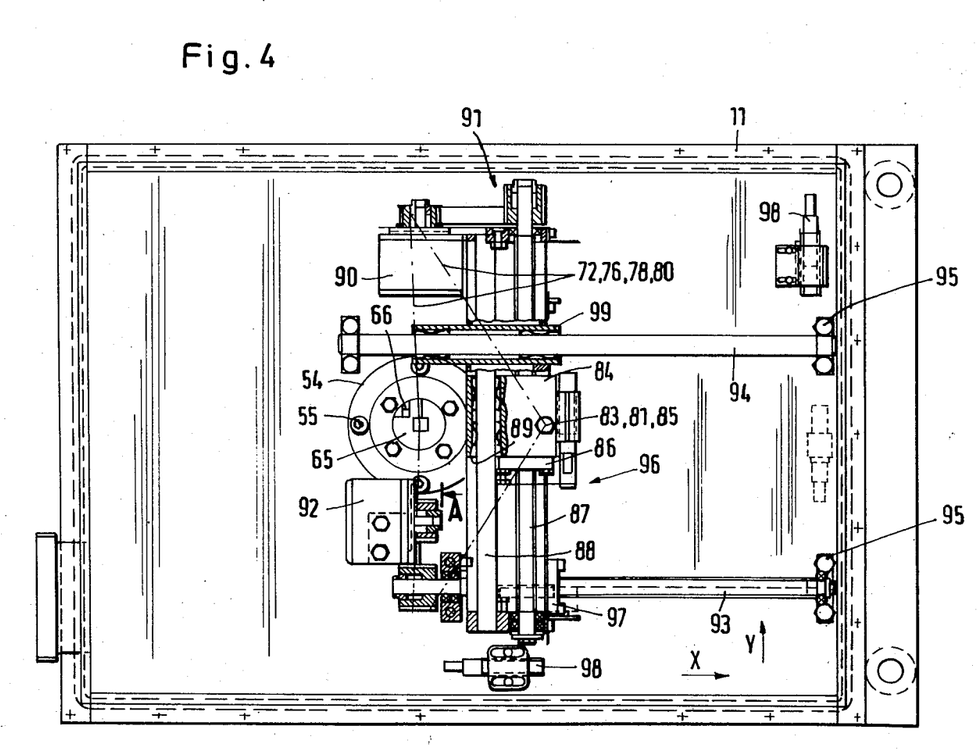
FIG. 4 is a top-plan view of the manipulator according to FIG. 3 with the covering hood removed.

In FIG. 4, the levers 72, 76, 78, 80 are only indicated by broken lines, so that the slider 84 and its driving elements can be seen better. The slider 84 is supported by a nut 86 which is associated with a ball bushing spindle 87. A rod 88 extends parallel to the spindle 87 and contributes to the guidance of the spindle 87 during motion in the Y-direction through slide bearings 89 associated with the slider 84. If such a motion is to take place, the ball bushing spindle 87 is set in rotation by a stepping motor 90 through a serrated belt drive 91 and moves the nut 86 with the slider 84. An identical stepping motor 92 provides for the movement of the slider 84 in the X-direction, through a ball bushing spindle 93 which is likewise driven by a serrated belt, and through a rod 94 extended parallel thereto. To this end it is necessary for the ball bushing spindle 93 and the rod associated with it to be fastened directly to the base plate 11 through pillow blocks 95. The slider 84 and the associated driving elements, on the other hand, are supported by a frame 96 which is associated with a nut 97 of the ball bushing spindle 93 and a slide bearing 99 of the rod 94. Initiators or primers 98 ensure that the movements of the slider 84 cannot go beyond predeterminable end positions.

According to FIGS. 3 and 6, the levers 76, 73 which are disposed with mirror symmetry relative to the levers 72, 77 on the hub 71 of the hollow shaft 58 and on the carrier 70 of the solid shaft 57 in the water of the pit, are each associated with further levers 100, 101 through a respective bearing-supported pin 102. The free ends of the levers 100, 101 form a common fulcrum 103 which has a fixed point 106 screwed in at that location to a slider 104 carrying the probes, by a threaded bolt 105. The fulcrum 85 of the slider 84 which is disposed in the waterproof space 46, and the fixed point 106 of the slider 104 carrying the probes 10, are therefore disposed vertically on top of each other. The part 53 which passes through the base plate 11 ensures the accurate movement of the two fixed points 85, 106. The slider 104 can be moved in the X-direction through a rod and slide bearing guide 108 which is located in a housing 107. Two rods 110 fastened to the underside of the base plat 11 by pillow blocks 109, take care of guiding the slider 104 in the Y-direction. One rod 110 is surrounded by a slide bearing 111, while only a roller 112 runs on the other rod 110. A supply line 114 which passes on the signals of the ultrasonic testing heads 44 to a non-illustrated evaluation unit, leads away from a probe mount 113. The probe mount 113 is furthermore associated with a force pickup 116 which is supplied through an electric lead 115, so that the running motion of the probes is stopped when they run up on an obstacle. The probe mount is furthermore provided with a guiding piece 117 matched to the cross section of the probes, so as to support the probes in their running motion.

Figure 8:
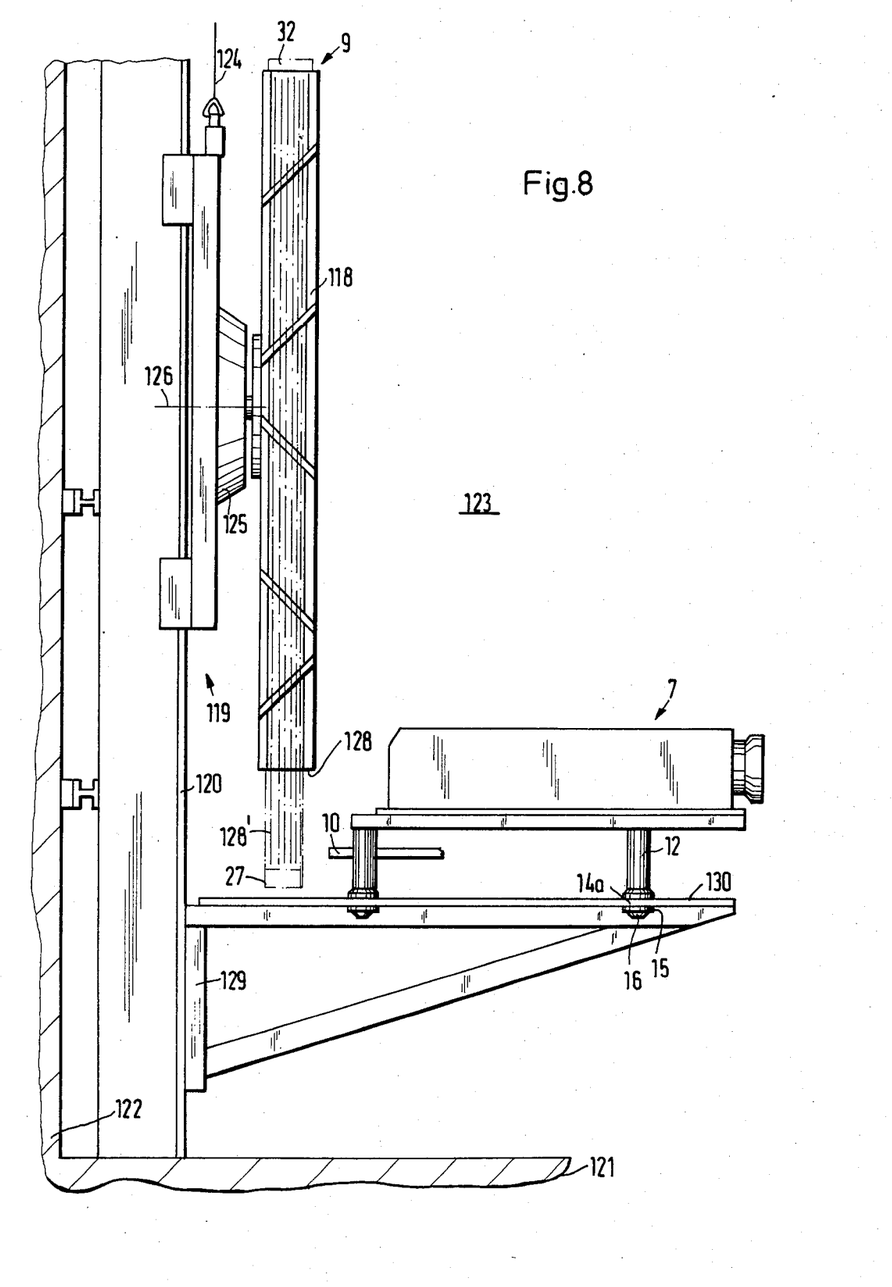
FIG. 8 is a fragmentary, partly cross-sectional side-elevational view of an apparatus for carrying out another method according to the invention.

FIG. 8 shows another embodiment of a device for carrying out the method. Accordingly, the fuel assembly 9 is inserted into a fuel assembly container 118 of a fuel assembly repair station 119 and held in its vertical position. A guide rail 120 of the repair station 119 is held at the bottom 121 and at one side wall 122 of a fuel assembly storage pit 123. The interposition of a cable drive 124 for a vertical movement of the fuel assembly container 118 along the guide rail 120 and a driving unit 125 for a tilting motion of the fuel assembly container about the axis 126, permit the container to be supported by the guide rail. In the conventional repair station, the defective fuel rods (formed of cladding tubes which contain fuel pellets and are closed off by end plugs) which have been localized outside the repair station, are disassembled. The method according to the invention permits the localization of the defective fuel rods within the repair station. To this end, the fuel assembly is braced and locked at the upper end of the fuel assembly container through a fuel assembly head 32. The fuel assembly is freely suspended downward in the fuel assembly container and extends with its fuel assembly base 27 beyond the lower edge 128 of the container so far that the cladding tubes 128' protrude at least 10 mm out of the container. The container is formed of a steel skeleton. A bracket 129 fastened to the guide rail 120 has a bracket plate 130 which carries the manipulator 7, as is shown in detail in FIG. 3. The manipulator 7 is supported by three dowel holes 14a and dowel pins 12 supported at the plate 130. A lock engaging at the head 32 is matched to the dowel holes in the bracket in such a manner that the probes 10 of the manipulator 7 can run through the spaces between the cladding tubes 128. With this novel combination of a repair station and a manipulator, the localization and the replacement of defective fuel rods can be combined in a single device.

The foregoing is a description corresponding in substance to German application No. P 33 37 084.2, filed Oct. 12, 1983, the International priority of which is being claimed for the instant application, and which is hereby made part of this application. Any material discrepancies between the foregoing specification and the aforementioned corresponding German application are to be resolved in favor of the latter.

I claim:

1. Method for locating defective fuel rod cladding tubes of a water-cooled nuclear reactor within fuel rod bundles combined to form complete fuel assemblies disposed in a water-filled fuel assembly storage pit having a given water level, including a mooring, a carriage disposed on the mooring, a manipulator disposed on the carriage and having a water proof space disposed therein below the given water level, driving elements of the manipulator disposed in the water proof space, probes disposed directly in the water of the pit and connected to the driving elements, at least one ultrasonic test head disposed on each of the probes, and a lifting device for holding the fuel assemblies, which comprises: centering a fuel assembly to be tested on the mooring with the lifting device, moving the carriage into a test position, and transmitting motion cycles of the driving elements in the water proof space below the given water level to the probes in the water of the pit for moving the probes and test heads between the cladding tubes.

2. Method for locating defective fuel rod cladding tubes of a water-cooled nuclear reactor within fuel rod bundles combined to form complete fuel assemblies disposed in a water-filled fuel assembly storage pit having a given water level, including a receiving container for receiving a fuel assembly to be tested, a bracket, a manipulator disposed on the bracket and having water proof space disposed therein below the given water level, driving elements of the manipulator disposed in the water proof space, probes disposed directly in the water of the pit and connected to the driving elements, and at least one ultrasonic test head disposed on each of said probes, which comprises: securing a fuel assembly to be tested in the receiving container in a vertical position, locking the manipulator in a test position on the bracket, and transmitting motion cycles of the driving elements in the water proof space below the given water level to the probes in the water of the pit for moving the probes and the test heads between the cladding tubes.

3. Method according to claim 1, including a first slider in the water proof space connected to the driving elements, a first lever linkage in the water proof space connected to the first slider, a second lever linkage in the water of the pit connected to the first lever linkage, and a second slider connected to the second lever linkage, the probes being supported by the second slider, which comprises moving the first slider linearily in X and Y-directions with the driving elements, converting the linear motion of the first slider into rotary motion with the first lever linkage, transmitting the rotary motion of the first lever linkage in the water proof space into linear motion in the water of the pit with the second lever linkage, and transmitting the linear motion of the second lever linkage to the second slider.

4. Method according to claim 2, including a first slider in the water proof space connected to the driving elements, a first lever linkage in the water proof space connected to the first slider, a second lever linkage in the water of the pit connected to the first lever linkage, and a second slider connected to the second lever linkage, the probes being supported by the second slider, which comprises moving the first slider linearily in X and Y-directions with the driving elements, converting the linear motion of the first slider into rotary motion with the first lever linkage, transmitting the rotary motion of the first lever linkage in the water proof space into linear motion in the water of the pit with the second lever linkage, and transmitting the linear motion of the second lever linkage to the second slider.

5. Apparatus for locating defective fuel rod cladding tubes of a water-cooled nuclear reactor within fuel rod bundles combined to form complete fuel assemblies, the fuel assemblies being disposed in fuel assembly storage racks in a water-filled fuel assembly storage pit having a given water level, and the fuel assemblies having bases, comprising a mooring, a plurality of pins connected to said mooring and matchable to the dimensions of the upper surface of a storage rack for securing said mooring, a centering receptacle with a variable centering dimension disposed on said mooring for contacting the base of the fuel assembly on two opposite sides thereof, a carriage movable on said mooring between two positions, a manipulator disposed on said carriage, said manipulator having a supporting base plate and a cover hood defining a water proof space therebetween below the given water level, driving elements disposed in said water proof space, means connected to said driving elements and passing through said base plate for converting linear motion of said driving elements into rotary motion, probes disposed directly in the water of the storage pit and connected to said motion converting means, and at least one ultrasonic test head disposed on each of said probes for insertion between the cladding tubes.

6. Apparatus according to claim 5, wherein said mooring includes a base plate having T-shaped slots formed therein, and said pins are in the form of sliding blocks movable and lockable in said slots.

7. Apparatus according to claim 5, wherein said mooring includes another base plate and said centering receptacle includes an abutment fastened to said other base plate, an eccentric shaft opposite said abutment, a rocker disposed on said shaft for moving said shaft by remote control, and a stop disposed on said shaft for limiting motion of said shaft.

8. Apparatus according to claim 5, wherein said centering receptacle includes a guide and jaws movable along said guide in opposing directions.

9. Apparatus according to claim 5, wherein said mooring includes another base plate and tracks fastened to said other base plate for guiding said carriage, said first-mentioned base plate of said manipulator having dowel pins protruding outwardly therefrom, said dowel pins being screwed into dowel holes formed in said other base plate, and including a remote control linkage for moving said carriage.

10. Apparatus according to claim 5, wherein said mooring includes another base plate and tracks fastened to said other base plate for guiding said carriage, said first-mentioned base plate of said manipulator having dowel pins protruding outwardly therefrom, said dowel pins being screwed into dowel holes formed in said other base plate, and including a hydraulic cylinder for moving said carriage.

11. Apparatus according to claim 5, wherein said mooring includes another base plate and tracks fastened to said other base plate for guiding said carriage, said first-mentioned base plate of said manipulator having dowel pins protruding outwardly therefrom, said dowel pins being screwed into dowel holes formed in said other base plate, and including a pneumatic cylinder for moving said carriage.

12. Apparatus according to claim 5, including means connected to said manipulator for admitting compressed air to said water proof space raising the pressure of said water proof space above the water pressure in said storage pit, and means connected to said manipulator for indicating a leak in said water proof space.

13. Apparatus according to claim 5, wherein said motion converting means includes a flange passing through and bolted to said base plate of said manipulator, a hollow shaft with a free end and a solid shaft with a free end both being coaxial with said flange, a first lever connected to one of said free ends in said water proof space, a second lever connected to the other of said free ends outside said water proof space, a third lever articulatingly connected to said first lever, a fourth lever articulatingly connected to said second lever, said first and third levers forming a lever linkage in said water proof space in the form of a mirror-symmetrical parallelogram with a first fixed point in said water proof space, said second and fourth levers forming another lever linkage outside said water proof space in the form of another mirror-symmetrical parallelogram with a second fixed point outside the water proof space, a first slider connected to said first fixed point for executing linear driving motions, and a second slider connected to said second fixed point carrying said probes.

14. Apparatus according to claim 13, including two ball bushing spindles connected to said first slider for moving said first slider, and two stepping motors each being connected to a respective one of said spindles.

15. Apparatus according to claim 13, including a force pickup associated with said second slider for protecting the probes against run-on motions thereof.

16. Apparatus for locating defective fuel rod cladding tubes of a water-cooled nuclear reactor within fuel rod bundles combined to form complete fuel assemblies disposed in a water-filled fuel assembly storage pit having a given water level, the fuel assemblies having bases, comprising a receiving container holding a fuel assembly to be tested in a vertical position, said container having a lower edge, the cladding tubes associated with the base of the fuel assembly having a portion thereof protruding beyond said lower edge of said container, a bracket attached to the storage pit, a manipulator locked on said bracket in a test position, said manipulator having a water proof space disposed therein below the given water level, driving elements disposed in said water proof space, probes disposed directly in the water of the storage pit and connected to said driving elements, and at least one ultrasonic test head disposed on each of said probes for insertion between the cladding tubes at the portion of the cladding tubes protruding beyond said lower edge of said container.

* * * * *